Nov. 25, 1958     A. T. SHEPHERD ET AL     2,862,200
MEASURING APPARATUS
Filed June 26, 1956     2 Sheets-Sheet 1
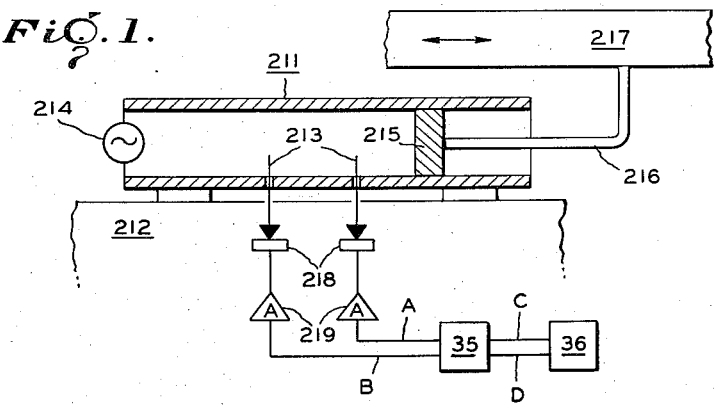
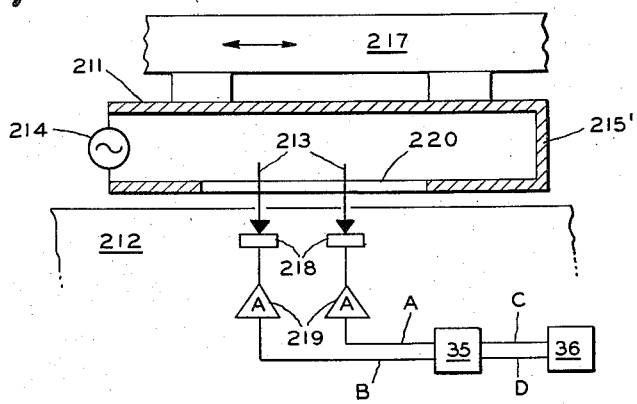
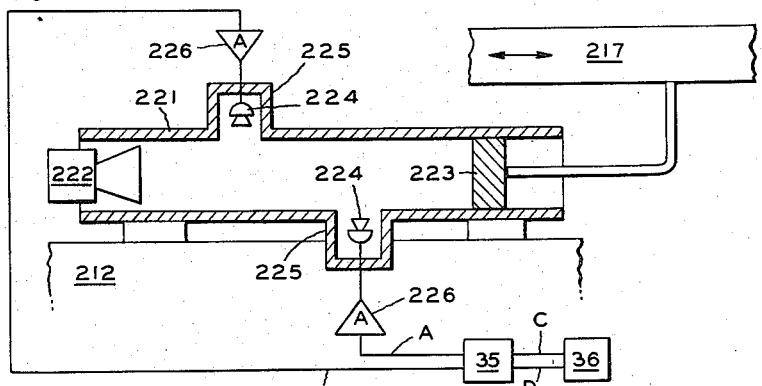
INVENTORS
Alexander Turnbull Shepherd
George Sanderson Walker
David Theodore Nelson Williamson
BY Cameron, Kerkam & Sutton
ATTORNEYS Nov. 25, 1958  A. T. SHEPHERD ET AL  2,862,200
MEASURING APPARATUS
Filed June 26, 1956  2 Sheets-Sheet 2

INVENTORS
Alexander Turnbull Shepherd
George Sanderson Walker
David Theodore Nelson Williamson
BY Cameron, Kerkam & Sutton
ATTORNEYS

United States Patent Office 2,862,200
Patented Nov. 25, 1958

2,862,200

MEASURING APPARATUS

Alexander Turnbull Shepherd, George Sanderson Walker, and David Theodore Nelson Williamson, Edinburgh, Scotland, assignors to Ferranti, Limited, Hollinwood, England, a company of Great Britain and Northern Ireland Application June 26, 1956, Serial No. 593,916

Claims priority, application Great Britain March 14, 1953

6 Claims. (Cl. 340—177)

This invention relates to measuring apparatus for determining the extent and sense of the movement of an object in one or other of two opposite directions with respect to some reference structure.

The invention is a modification of that described and claimed in copending patent application Serial No. 415,942, filed March 12, 1954, hereinafter referred to as the parent application, of which this a continuation-in-part.

In accordance with the present invention, measuring apparatus for determining the extent and sense of the relative movement of a first object in one or other of two opposite directions with respect to a second object comprises means for setting up a standing-wave pattern adapted to move with respect to said second object in dependence on the said relative movement of said first object, two detecting devices adapted during the said movement of the pattern to respond electrically to the conditions of the pattern at two positions fixed with respect to the second object where said conditions are out of phase with one another by a fraction of half the wavelength of the pattern, and electrical stages for determining the sense of the said relative movement of said first object from the relative phase of the electrical output signals from said detecting devices and for determining the extent of said movement from the number of cycles of said output signals which occur during said movement.

In the accompanying drawings:

Figures 1, 2 and 3 are diagrammatic showings of three different embodiments of the invention, partly in section and partly in block form;

Figure 4:
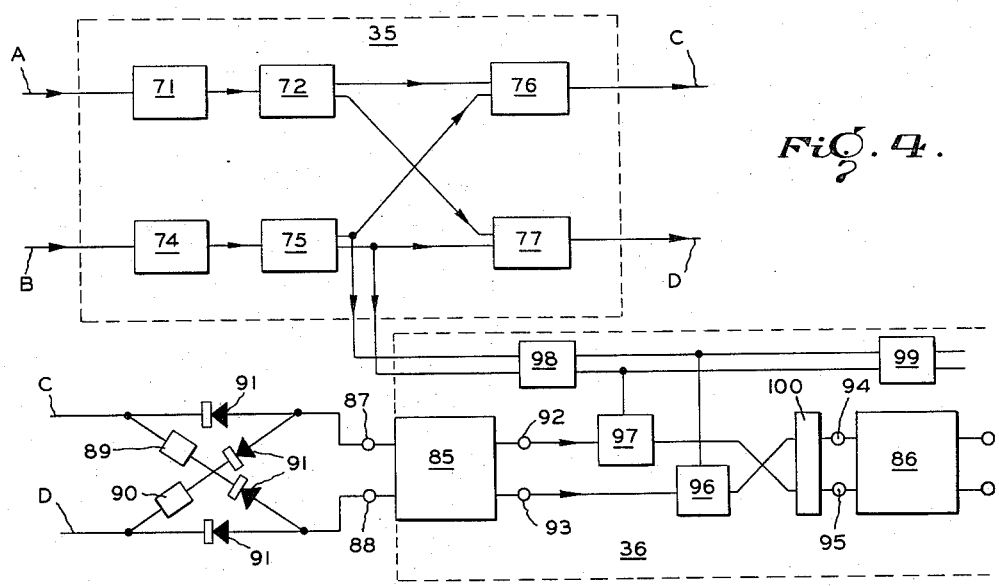
Figure 4 is a schematic diagram of details of one form of electrical equipment shown generally in Figures 1, 2 and 3.

The invention will now be described by way of example as used for determining the extent and direction of the straight-line movement of a first object, such as the work table of a milling machine, with respect to a second object, such as the fixed bed of the machine.

The wave pattern is an electromagnetic standing-wave pattern set up in a short length of transmission line in the form of a rectangular waveguide 211 secured to the fixed bed 212 of the machine. Secured through one of the broader walls of the guide on the centre line of the wall at two positions spaced along the guide axis are two detecting devices in the form of probes 213. Microwave energy of sinusoidal waveform derived from a generator 214 is fed into one end of the guide. The other end of the guide is constituted by a short-circuiting element in the form of a plunger 215 carried by an arm 216 secured to the work table 217 of the machine so that movement of the table relative to the fixed bed causes the plunger to move in one or other direction along the guide. The short-circuiting element is thereby fixed with respect to the said first object.

It will be appreciated that the presence of the plunger causes a standing-wave pattern to be set up in the guide when the generator is delivering energy into the other end. The probes 213 are spaced along the guide axis at positions where the conditions of the standing-wave pattern are out of phase with one another by a fraction of half the wavelength of the pattern. By the "condition of the pattern" at a position along the guide axis is meant the amplitude of the wave at that position. The preferred distance between the probes is a quarter wavelength.

Each probe is connected to a crystal detector 218 and amplifier 219 individual to it, and by leads A and C, or B and D, as the case may be, to discriminator and counter stages 35 and 36 of the same character as those disclosed in the parent application.

In operation, movement of the table 217 relative to the fixed bed 212 in the direction indicated by the arrows causes the plunger 215 to move along the guide 211 to a corresponding extent and in the corresponding sense, i. e., direction. The standing-wave pattern is thereby caused to move along the guide—and therefore relative to the probes—in like correspondence, the conditions of the pattern (that is, the amplitudes of the wave) at each probe varying sinusoidally. The amplified electrical outputs derived from the probes and applied over leads A and B are therefore in the form of signal currents of sinusoidal waveform in quadrature with one another. Which is the leading current depends on the direction of the movement of the plunger and hence on the sense of the movement of the table relative to the bed. The stages 35 and 36 operate, as described in the parent application, to determine (a) the sense of that movement from the relative phase of those signals, and (b) the extent of the movement from the number of cycles of those signals which occur during the movement.

In a modified form of this arrangement (see Fig. 2) the waveguide 211 is fixed relative to the first object (the table 217) rather to the second object (the work bed, 212). The short-circuited element $215^1$, is again fixed to the table 217 and forms accordingly a fixed part of the guide, rather than a movable plunger. The probes 213 are again fixed relative to the work bed 212 and operate through a longitudinal slot 220 in the waveguide wall, which slot allows the guide to move relative to the probes.

In operation, movement of the work table 217 relative to the bed 212 causes the waveguide as a whole to move relative to the bed; as the standing-wave pattern is now fixed relative to the guide, this movement causes the pattern to move relative to the probes. There is thus a relative movement between probes and standing-wave pattern as before, and the other details of the operation are accordingly as already described.

In either of the above arrangements the waveguide may be replaced by a length of coaxial transmission line.

The wave pattern may alternatively be an ultrasonic standing-wave pattern of acoustic pressure-waves set up in a short length 221 (see Fig. 3) of an acoustic transmission line or waveguide (secured to the bed 212) by an acoustic generator 222.

The other end of the guide is formed by an adjustable plunger 223 secured to the table 217 and acting as a reflector of acoustic waves. The arrangement is very similar to that of Fig. 1. The detecting devices are in the form of microphones 224, each being located at the end of a branch guide 225 suitably matched to prevent reflections. The branch guides 225 are spaced along the axis of the main guide 221 so that the conditions of the standing-wave pattern at these two points are out of phase with one another to the extent defined above with regard to the spacing of the probes 213 of the embodiment described with reference to Fig. 1.

Each microphone is connected to an amplifier 226 individual to it and by lead A or B, as the case may be, to discriminator and counter stages 35 and 36.

Except that the standing-wave pattern is an acoustic wave pattern instead of an electromagnetic wave pattern and the detecting devices are microphones instead of probes, this embodiment operates in a similar manner to that described with reference to Fig. 1.

Figure 5:
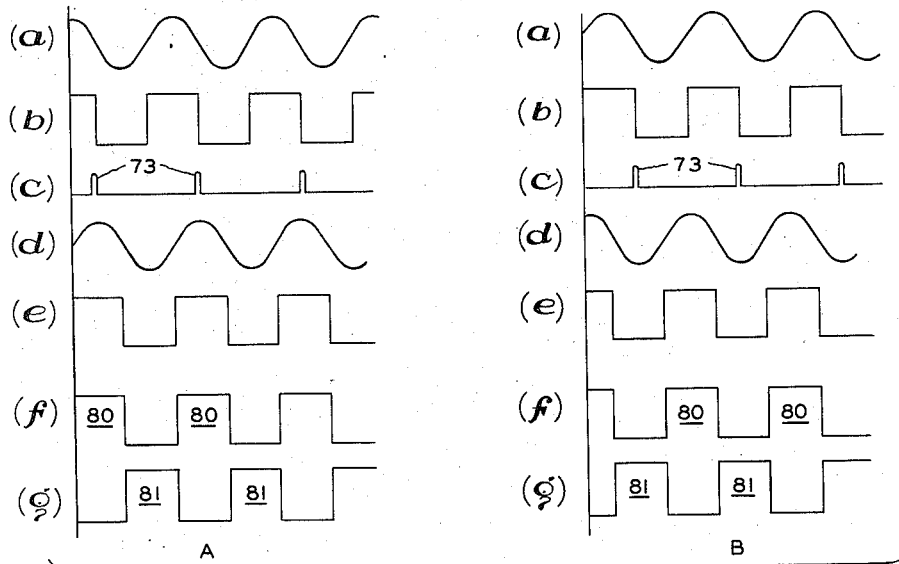
Figure 5 shows electrical waveforms to illustrate the operation of the equipment of Figure 4.

As above mentioned, discriminator and counter stages 35 and 36 may be of the same character as those disclosed in the parent application. However, by way of example, one embodiment of suitable equipment for discriminator 35 and counter 36 will now be described with reference to the diagram of Fig. 4 and the waveforms of Fig. 5A (current A leading) and Fig. 5B (current B leading).

The discriminator 35 includes an A channel and a B channel fed by signals received from probes 213 (Figs. 1 and 2) or microphones 224 (Fig. 3) over leads A and B, respectively. The A channel includes a combined D. C. amplifier and squaring stage 71 designed to produce from the A current (Fig. 5 waveform (a)) a signal of square waveform (b) in synchronism with it. This stage is followed by a pulse-forming stage 72 for deriving from the output of stage 71 a sharp pulse 73 (waveform (c)) in coincidence with each negative-going edge of waveform (b); a differentiator followed by a rectifier are suitable components for this stage. One pulse is therefore produced in respect of each cycle of the A current. These pulses will be referred to for convenience as the A pulses.

The B channel includes another D. C. amplifier and squaring stage 74 similar to stage 71 to produce from the B current (waveforms (d)) a signal of square waveform (e) in synchronism with it. This signal is applied to a push-pull stage 75 designed to produce a first square-wave output signal (f) in phase with signal (e) and a second square-wave output signal (g) in counterphase.

In the A channel is a gating stage 76 and in the B channel another gating stage 77. These will be referred to for convenience as the A gate and the B gate. Each gate is of the kind designed to produce an output signal only when each of two input signals is positive. The A pulses from stage 72 are applied in a positive-going sense as one of the inputs to each gate. First output signal (f) from push-pull stage 75 is applied as the other input to the A gate, whilst the second output signal (g) is applied as the other input to the B gate. Each of the gates may conveniently comprise a pentode valve to the control grid and suppressor grid of which are applied the A pulses and the square-wave signals respectively. The valve is biased on both grids to anode current cut-off and is designed to conduct when both the signals on these grids are positive. The outputs from the gates A and B are applied to counter 36 over the above-mentioned leads C and D respectively.

It will be apparent from the above description that:

(a) There is one A pulse per cycle of each of the first and second output signals (f) and (g);

(b) Owing to the quadrature displacement of currents A and B each A pulse 73 occurs in approximate synchronism with the midpoint of a square-wave half cycle of those signals; each pulse 73 therefore occurs wholly within a half-cycle period of signals (f) and (g), that is to say, the pulse does not occur partly in one half-cycle and partly in the next;

(c) One of the half-cycles with which each A pulse 73 coincides is positive and the other negative, since these signals are in counterphase;

(d) Each gate 76 and 77 passes the A pulse when the coinciding half-cycle is of positive sense, this sense being predetermined and the same for each gate, and (e) The criterion which determines whether these positive half-cycles are those of the first or the second output signals (f) or (g) is the phase relationship between the quadrature A and B currents, i. e., which is the leading current.

It is assumed that the arrangement is such that when the A current is leading (Fig. 5A), the positive half-cycles coinciding with the A pulses are those half-cycles 80 of the first output signal (f); and that when the B current is leading (Fig. 5B), the positive half-cycles coinciding with the A pulses are those half-cycles 81 of the second output signal (g).

When, therefore, the A current is leading, each A pulse arrives at the A gate at a time when the other input signal to the gate is also of positive sense; the result is that this gate passes each A pulse over the above-mentioned lead C. On the other hand each A pulse arrives at the B gate when the other input signal to this gate is negative, for the reason indicated in sub-paragraph (c) above. This gate accordingly remains closed and no pulses are passed over lead D. The pulses to the counter are therefore applied over lead C only.

Similarly when the B current is leading, the A gate is maintained closed and the counter receives pulses over lead D only.

The counter 36 may consist of a sufficient number of scale-of-ten counting tubes connected in cascade and arranged for algebraic summation. The units and tens tubes are shown generally at 85 and 86 respectively. These tubes may be of the Dekatron type; in which case arrangements are made to apply the pulses on lead C to guide ring No. 1 (shown at 87) of the "units" tube 85 with no time-lag and to guide ring No. 2 (shown at 88) with a time-lag supplied by a delay stage 89, and to apply the pulses on lead D to the guide rings 87 and 88 with a time-lag supplied by a delay stage 90, and without a time-lag, respectively. Metal rectifiers 91 are introduced into each of these four connections to the guide rings to prevent interaction.

The 9th and 10th electrodes 92 and 93 of tube 85 are coupled to the appropriate guide rings 95 and 94 of tube 86 by way of gates 97 and 96 and a time-lag network 100.

Gates 97 and 96 are controlled respectively by the second and first output signals (f) and (g) from push-pull stage 75 so that pulses from the 10th electrode 93 are passed when addition is required and pulses from the 9th electrode 92 when subtraction is required. As the tube 85 operates with an appreciable time-lag it is necessary to apply these control signals to the gates 96 and 97 through some sort of delay device or network indicated at 98 and to impose an additional delay on these signals by means of a further delay device 99 before applying them to the pair of gates (not shown) between the "tens" tube 86 and the "hundreds" tube (not shown) if supplied. An additional delay must similarly be imposed at each subsequent stage.

Network 100 consists of components similar to components 89, 90 and 91 of the network associated with "units" tube 85, connected in the same manner, so that the pulses from electrode 92 are applied to guide ring 95 with no time-lag but to guide ring 94 with a time-lag, whereas the pulses from electrode 93 are applied to guide rings 95 and 94 with and without a time-lag, respectively. A similar network is used for the "hundreds" and each higher tube.

The operation of the counter need not be described in detail since each tube operates in a known manner, adding or subtracting each pulse in dependence on which of the two guide rings the pulse reaches first.

Various details of the apparatus herein described may be modified within the scope of the invention. For example, in the discriminator described with reference to Figs. 4 and 5, the two square-wave output signals from stage 75 need not be in phase and counterphase, respectively, with the B current as long as they have a fixed phase relationship with respect to the B current and are of opposite phase to each other. The A and B gates may be modified so that the predetermined sense of the half-cycles that cause the coinciding A pulses to be passed to the counter may be negative, rather than positive; in which case these square-wave signals may be applied to the cathodes of the gating valves.

Any embodiment of the invention described above may be used as a strain gauge, an extensometer, or other instrument in which the extent and sense of the movement of an object in one or other of two opposite directions with respect to some reference structure has to be precisely determined. The invention may also be used for deriving an error signal in a servo system—for example, to control the advance of of a tool holder along a lathe bed—in the manner indicated in the parent application.

What is claimed is:

1. Measuring apparatus for determining the extent and sense of the relative movement of a first object in one or other of two opposite directions with respect to a second object comprising means for setting up a standing-wave pattern adapted to move with respect to said second object in dependence on the said relative movement of said first object, two detecting devices adapted during the said movement of the pattern to respond electrically to the conditions of the pattern at two positions fixed with respect to the second object where said conditions are out of phase with one another by a fraction of half the wavelength of the pattern, and electrical stages for determining the sense of the said relative movement of said first object from the relative phase of the electrical output signals from said detecting devices and for determining the extent of said movement from the number of cycles of said output signals which occur during said movement.

2. Apparatus as claimed in claim 1 wherein said means for setting up a standing-wave pattern comprises a length of electromagnetic wave transmission line, a generator for delivering cyclic electromagnetic wave energy to the line, and a short-circuiting element across the line, said element being fixed with respect to the first object and said detecting devices being located between the generator and said element at said two positions respectively.

3. Apparatus as claimed in claim 2 wherein said transmission line is fixed relative to said second object.

4. Apparatus as claimed in claim 2 wherein said transmission line is fixed relative to said first object.

5. Apparatus as claimed in claim 1 wherein said means for setting up a standing-wave pattern comprises a length of acoustic wave transmission line, a generator for delivering cyclic acoustic wave energy to the line, and a reflecting element across the line, said element being fixed with respect to the first object and said detecting devices being located between the generator and said element at said two positions respectively.

6. Measuring apparatus for determining the extent and sense of the relative movement of a first object in one or other of two opposite directions with respect to a second object comprising means for setting up a cyclic wave pattern adapted to move with respect to said second object in dependence on the said relative movement of said first object, two detecting devices adapted during the said movement of the pattern to respond electrically to the conditions of the pattern at two positions fixed with respect to the second object where said conditions are out of phase with one another by a fraction of half the cyclic wavelength of the pattern, and electrical stages for determining the sense of the said relative movement of said first object from the relative phase of the electrical output signals from said detecting devices and for determining the extent of said movement from the number of cycles of said output signals which occur during said movement.

References Cited in the file of this patent

UNITED STATES PATENTS

| | | |
|---|---|---|
| 2,413,939 | Benware | Jan. 7, 1947 |
| 2,481,993 | Fuss | Sept. 13, 1949 |
| 2,591,329 | Zaleski | Apr. 1, 1952 |
| 2,680,837 | Sensiper | June 8, 1954 |

FOREIGN PATENTS

| | | |
|---|---|---|
| 638,028 | Great Britain | May 31, 1950 |

OTHER REFERENCES

Electrical Engineering, vol. 73, No. 3, pp. 251–255, March 1954, "Microwaves Used to Observe Commutator-Surfaces."